United States Patent [19]

Liertz

[11] 4,379,614
[45] Apr. 12, 1983

[54] SPLICE CONNECTION FOR A PAIR OF LIGHT WAVEGUIDE CABLES WITH OPTICAL FIBERS IN TUBULAR SHEATHS

[75] Inventor: Heinrich Liertz, Munich, Fed. Rep. of Germany

[73] Assignee: Siemens Aktiengesellschaft, Berlin & Munich, Fed. Rep. of Germany

[21] Appl. No.: 181,946

[22] Filed: Aug. 27, 1980

[30] Foreign Application Priority Data

Sep. 11, 1979 [DE] Fed. Rep. of Germany ....... 2936716

[51] Int. Cl.³ .............................................. G02B 7/26
[52] U.S. Cl. ................................ 350/96.21; 174/84 R; 350/96.23
[58] Field of Search ............... 174/84 R, 88 C, 93; 350/96.21, 96.23

[56] References Cited

U.S. PATENT DOCUMENTS

| | | | |
|---|---|---|---|
| 1,897,630 | 2/1933 | Chamberlain | 174/93 X |
| 2,644,028 | 6/1953 | Bernet | 174/88 C |
| 3,297,819 | 1/1967 | Wetmore | 174/84 R X |
| 4,039,248 | 8/1977 | Franke et al. | 350/96.23 |
| 4,179,186 | 12/1979 | Tynes | 350/96.21 |
| 4,261,644 | 4/1981 | Giannaris | 350/96.21 |

FOREIGN PATENT DOCUMENTS

| | | |
|---|---|---|
| 2425798 | 1/1975 | Fed. Rep. of Germany . |
| 2729682 | 1/1979 | Fed. Rep. of Germany . |
| 2754347 | 6/1979 | Fed. Rep. of Germany ... 350/96.21 |
| 1458831 | 12/1976 | United Kingdom . |

OTHER PUBLICATIONS

Bark, *Fiber Optic Cable Design Testing and Installation Experiences*, Conf. Proc. of 27th Wire & Cable Symp. Nov. 1978, pp. 379-384.
C. M. Miller, "Optical Fiber Splicing", published in *Technical Digest* of Topical Meeting on Optical Fiber Transmission II, Feb. 22-24, 1977 at Williamsburg, Va.

*Primary Examiner*—Paul L. Gensler
*Attorney, Agent, or Firm*—Hill, Van Santen, Steadman, Chiara & Simpson

[57] ABSTRACT

A connecting device for a pair of light waveguide cables with each cable having an optical fiber which is loosely enclosed in a tubular sheath characterized by a joint between the ends of the pair of sheaths of the two cables being bridged by an appropriate tube which is fixed to the ends of the two sheaths and does not require any special housing such as bushing and the like. The tube may be an inner tube, which is inserted into the interiors of the pair of tubular sheaths being connected together or an outer tube which is fixed onto the tubular sheaths. In another embodiment, both an inner and outer tube are utilized. A length adjustment of the optical fiber within the pair of tubular sheaths can be carried out by virtue of a helical arrangement of the optical fiber and the bridging which is provided by the one or more tubes.

2 Claims, 1 Drawing Figure

U.S. Patent
Apr. 12, 1983
4,379,614
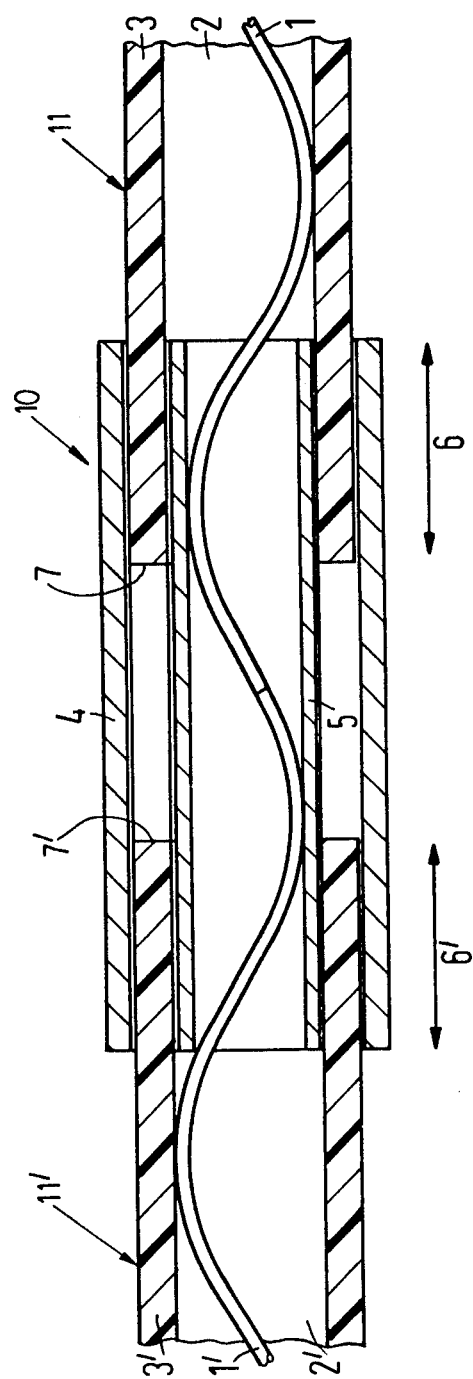

SPLICE CONNECTION FOR A PAIR OF LIGHT WAVEGUIDE CABLES WITH OPTICAL FIBERS IN TUBULAR SHEATHS

BACKGROUND OF THE INVENTION

The present invention is directed to providing a connecting device for a pair of light waveguide cables, which have an optical fiber which are spliced together without butt gaps and are loosely enclosed and arranged in a helical formation in tubular sheaths of the pair of cables.

Various connecting arrangements or devices for light waveguides are known. Generally, these devices relate to a connection of the light waveguides themselves and provide arrangements or devices for centering and aligning the ends of the light waveguides or optical fibers. A connecting arrangement of this type is described for example in German O.S. No. 24 25 798 and this device has a tubular sheath which encloses the ends of the light waveguides which are to be connected together. The tubular sheath is shrunk onto the exposed ends of the light waveguides in order that they may be fixed and centered.

However, this connection relates merely to the light waveguide connection itself and not to the connection of the tubular sheaths of the light waveguide cables. Since these connections are accommodated in bushings or the like, problems of connecting the tubular sheaths of the light waveguide cables is not generally at the forefront. That is to say that in the case of a light waveguide splice of this kind, the cable ends which are to be connected are usually introduced into a special housing. However, splices of this kind are not advantageous if the optical fibers are merely to be connected in the cable and not as in the indicated situation are also divided.

SUMMARY OF THE INVENTION

The present invention is directed to providing a cable splice by means of which the optical fibers, in particular, are loosely enclosed in the tubular sheaths which can be connected in a cable joint without the use of special housings. These objects are realized by means of an improvment in a connecting device for a pair of light waveguide cables with optical fibers which are spliced without butt gaps and are loosely enclosed and arranged in a helical formation in a pair of tubular sheaths of the cable which sheaths have their ends connected by a joint. The improvement comprises at least one tube being positioned to bridge the joint between ends of the tubular sheaths of the enclosed optical fibers.

The fundamental principal of the invention consists in the fact that the splicing together of the two cables without the use of a bushing which is to be understood as a total splice, scarcely results in any thickening of the spliced cable. The splicing of the optical fibers, the tubular sheaths surrounding these optical fibers and the cable sheaths which are covering all of the tubular sheaths are arranged together without butt gaps.

This procedure requires that the optical fiber should be able to be precisely spliced at the required length so that no intersection point occurs in the joint of the optical fibers with their surrounding tubular sheaths. If however exact lengths are not given, it is possible to use an optical fiber which is introduced in a helical formation in which it has an excess length so that it is possible to effect a specific length adjustment within the tubular sheaths.

The invention now solves this problem by the fact that the ends of the optical fibers, which are spliced without butt gaps, are again introduced into the tubular sheaths and by the fact that at least one tube is used to serve as a bridge at the joint between the tubular sheaths. This bridging of the tubular sheaths can be carried out by either using an outer tube whose diameter matches the diameter of the tubular sheaths or by using an inner tube whose outer diameter matches the inner diameter of tubular sheaths. Also both an inner and outer tube can be used simultaneously. All these possibilities involve corresponding advantages in the terms of their use and yet all are based on the same principal. Another important factor consists in the fact that when tubular sheaths are used together with tubes, a specific adjustment of length can be effected because the tubular sheaths can be attached to the tube or tubes with the ends spaced at different distances from one another. The bridging of the inter space or interval which is produced between the ends of the sheaths is effected by means of the single tube or pair of tubes of the connection. This possibility could lead one to a so-called "breathing" splice connection since the length adjustment can be varied as needed.

BRIEF DESCRIPTION OF THE DRAWING

The FIGURE is a longitudinal cross-sectional view of a connecting device in accordance with the present invention.

DESCRIPTION OF THE PREFERRED EMBODIMENTS

The principles of the present invention are particularly useful in a connecting device or arrangement generally indicated at 10 in the FIGURE. The connecting device 10 is used for connecting an end of a light waveguide cable generally indicated at 11 to an end of a light waveguide cable generally indicated at 11'. The light waveguide cable 11 includes an optical fiber 1, which is loosely received in an inner space 2 of a sheath 3 which has an end surface 7 and as illustrated the fiber 1 has a helical formation or configuration. In a similar manner the cable 11' has an optical fiber 1', which is received in the inner space 2' of a sheath 3' that has an end surface 7' and the fiber 1' has a helical configuration or formation.

As illustrated in the FIGURE, the ends of the optical fibers 1 and 1' have been spliced together or joined to one another in a centered relationship without butt gaps for example by having the end surfaces welded together in a conventional manner. This assembled or spliced optical fiber is loosely received in a helical formation in the tubular sheaths 3 and 3'. An excessive length of the welded or joined together optical fiber has been provided in the tubular sheaths so that a length adjustment between the ends 7 and 7' of the sheaths 3 and 3' can be obtained.

Prior to joining the ends of the fibers 1 and 1' together to form the splice, an inner tube 5 of an appropriate diameter is introduced into a tubular sheath such as by having an end inserted into an interior 2 of the sheath 3 and an outer tube 4 is positioned to telescopically receive the tubular sheath 3. The outer diameter of the inner tube 5 and the inner diameter of the outer tube 4 are selected so that they are precisely positioned in and on, respectively, the tubular sheath as the case may be.

The inner diameter of the inner tube is also selected to be such that the spliced optical fibers 1 and 1' can continue to be arranged in a helical fashion. When the splicing process of the optical fiber ends of the fibers 1 and 1' has been completed, the two previously mounted tubes 4 and 5 are displaced so that they are finally gripped at the ends by both the tubular sheaths 3 and 3'. The ends of the tubular sheath 3 and 3' can be brought to a greater or lesser distance from one another so that it is possible to effect a variation between the end surface 7 of the sheath 3 and the end surface 7' of the sheath 3' between a position with actual contact and a position as illustrated with spacing or an interval therebetween. The remaining portion of the ends of the sheaths 3 and 3' will be gripped by the tubes 4 and 5. In this way, it is also possible to vary the helical positioning and thus the length adjustment of the spliced optical fibers. This variation possibility is indicated by the arrow 6 and 6' in the FIGURE.

In this exemplary embodiment, the tubes can be fixed most advantageously by shrinking the outer tube 4 onto the tubular sheaths 3 and 3' and onto the inner tube 5. These tubes 4 and 5 can advantageously consist of a metal; however, other resistant materials are also suitable. The tubes 4 and 5 can also be slotted lengthwise so that each have a longitudinally extending slot which will result in a good fit to the corresponding diameter of the tubular sheaths 3 and 3'. Furthermore this means that when the splicing process of the fibers has been completed, the longitudinal extending slot of the outer tube 4 enables the outer tube to be pressed and constricted onto the tubular sheaths to reduce the diameter of the outer tube 4 until it finally reaches the outer diameter of the tubular sheaths 3 and 3'. This will result in a spliced joint without any thickening so that the insertion of the connection 10 into a cable sleeve can be carried out without any problems. In this case however, it is necessary to use an appropriately adapted inner tube 5.

When the tubes 4 and 5 are to be mechanically clamped to the sheaths 3 and 3', it is expedient to roughen the surfaces at their ends in an appropriate fashion in order to insure a good grip between the surfaces of the tubes 4 and 5 and the sleeves 3 and 3'. Under certain circumstances the outer tube 4 can deviate from a conventional cylindrical shape and be replaced, for example, by a member having a U-shaped cross-section.

On the basis of the invention, the connection arrangement or device 10 can also be varied in accordance with the particular requirements. For example, in the case of lesser mechanical strain, it might be possible to dispense with the inner tube 5 and use solely the outer tube 4 or in another way to remove the outer tube 4 and rely solely on the inner tube 5. As a result the length adjustment can also be varied within limits. If the inner tube 5 is not present, the outer tube 4 limits the size or diameter of the helix of the spliced portion of the fibers 1 and 1' and the interval where the two ends 7 and 7' on the tubular sheath 3 and 3' do not meet.

The fixing of the tubes on the tubular sheaths 3 and 3' of the optical fibers can also be executed in different manners. Depending upon the nature of the synthetic material of the tubular sheaths 3 and 3', it is possible to use an adhesive which will secure the single tube 4 or 5 or both tubes 4 and 5 in the desired position on the sheaths.

Finally, it should be noted that the splicing process can be used even when the interior of the tubular sheaths 3 and 3' are filled with appropriate material.

Although various minor modifications may be suggested by those versed in the art, it should be understood that I wish to embody within the scope of the patent granted hereon, all such modifications as reasonably and properly come within the scope of my contribution to the art.

I claim:

1. A connecting device for a pair of light waveguide cables each having an optical fiber being loosely enclosed and arranged in a helical formation in a tubular sheath with an end of the fiber extending out of the end of the sheath, the device comprising the ends of the two optical fibers being butt-spliced together, an inner tube surrounding the butt-splice of the two fibers and having its ends being telescopically inserted into the ends of the sheaths to bridge the interval therebetween, and an outer tube having a longitudinally extending slot and being telescopically received on the ends of the sheaths, said outer tube being reduced in diameter to grip the ends of the sheaths so that the ends of the sheaths are supported by the inner tube as they are gripped by the outer tube.

2. A connecting device according to claim 1, wherein each of said tubes is secured to the pair of sheaths by means of an adhesive.

* * * * *